US008923337B2

(12) United States Patent
Singh

(10) Patent No.: US 8,923,337 B2
(45) Date of Patent: Dec. 30, 2014

(54) METHOD TO TRANSMIT MULTIPLE DATA-STREAMS OF VARYING CAPACITY DATA USING VIRTUAL CONCATENATION

(75) Inventor: Kanwar Jit Singh, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 204 days.

(21) Appl. No.: 13/257,272

(22) PCT Filed: Dec. 22, 2009

(86) PCT No.: PCT/IN2009/000732
§ 371 (c)(1),
(2), (4) Date: Sep. 16, 2011

(87) PCT Pub. No.: WO2010/134088
PCT Pub. Date: Nov. 25, 2010

(65) Prior Publication Data
US 2012/0002682 A1    Jan. 5, 2012

(30) Foreign Application Priority Data

May 22, 2009   (IN) .......................... 1176/CHE/2009

(51) Int. Cl.
*H04L 12/00*   (2006.01)
*H04L 12/64*   (2006.01)
*H04J 3/16*    (2006.01)

(52) U.S. Cl.
CPC ........... *H04L 12/6418* (2013.01); *H04J 3/1611* (2013.01); *H04J 2203/0094* (2013.01)
USPC ............. 370/476; 375/363; 375/372; 398/16; 398/25; 398/98

(58) Field of Classification Search
CPC ............ H04J 2203/0094; H04J 3/1611; H04L 12/6418
USPC .......... 370/218, 223, 235, 249, 258; 375/363, 375/372; 398/16, 25, 98
See application file for complete search history.

(56) References Cited

U.S. PATENT DOCUMENTS 5,369,653 A * 11/1994 Kuroda .......................... 714/819
6,891,862 B1 * 5/2005 Brady et al. .................... 370/539
7,224,706 B2 * 5/2007 Loeffler-Lejeune .......... 370/508

(Continued)

FOREIGN PATENT DOCUMENTS

WO   WO9731441   *   8/1997   ................ H04J 3/02

*Primary Examiner* — Jeffrey M Rutkowski
*Assistant Examiner* — Peter Mak
(74) *Attorney, Agent, or Firm* — Deborah Gador

(57) ABSTRACT

Instant discloser is a method to transmit multiple data-streams of varying capacity data using Virtual Concatenation (VCAT) over Synchronous Digital Hierarchy (SDH) network, comprising acts of determining number of data bytes to be requested for each Virtual Concatenation Group (VCG) in a row-time of the aggregated bandwidth and storing it in a VCG request configuration memory, reading the requested number of data bytes from each data-stream in order in to a Row Buffer for each row time of an SDH frame, reading data stored in the Row Buffer from memory address determined by one or more connection memory wherein the connection memory is programmed to carry out sequencing of bytes of the Row Buffer based on the VCAT numbering, and inserting path overhead (POH) and pointer information in to the read data streams in previous step to transmit multiple data-streams of varying capacity data using VCAT over SDH network.

20 Claims, 7 Drawing Sheets

(56) References Cited

U.S. PATENT DOCUMENTS

| | | | |
|---|---|---|---|
| 7,277,447 B2* | 10/2007 | Wang et al. | 370/412 |
| 2005/0174941 A1* | 8/2005 | Shanley et al. | 370/235 |
| 2006/0126641 A1* | 6/2006 | Song et al. | 370/395.51 |
| 2006/0187715 A1* | 8/2006 | Narvaez et al. | 365/185.24 |
| 2009/0141719 A1* | 6/2009 | Roy et al. | 370/390 |
| 2009/0285242 A1* | 11/2009 | Patenaude | 370/498 |

\* cited by examiner

METHOD TO TRANSMIT MULTIPLE DATA-STREAMS OF VARYING CAPACITY DATA USING VIRTUAL CONCATENATION

CROSS-REFERENCE TO RELATED APPLICATIONS

This application is the U.S. National Stage of International Patent Application No. PCT/IN2009/000732 filed on Dec. 22, 2009, which claims priority to Indian Patent Application No. 1176/CHE/2009 filed on May 22, 2009, the disclosures of which are hereby incorporated by reference in their entireties.

FIELD OF INVENTION

The present invention discloses a technique where the transmitter of multiple streams of data is able to handle arbitrary mix of multiplexing structures in the Synchronous Digital Hierarchy (SDH) networks, with an arbitrary assignment of members to the streams. The transport of multiple streams of varying capacity using Virtual Concatenation is used to offer data services over SDH/SONET networks.

BACKGROUND OF INVENTION AND PRIOR ART

In order to facilitate the efficient transfer of data of arbitrary bandwidth over an SDH network, techniques of Generic Framing Procedure (GFP) and Virtual Concatenation (VCAT) has been developed. Further enhancements to vary the bandwidth without any loss of data were enabled by the Link Capacity Adjustment Scheme (LCAS). These are standardized by the International Telecommunication Union (ITU) in its standards G.707, G.7041 and G.7042. SDH is a byte-oriented interface where the basic units of operation are 8 bits (a byte). As the speed of the SDH interfaces increases performing all the operations at a byte-level requires very high-speed operations. Furthermore, in the case of data-from multiple sources being sent over the SDH interfaces, the data is typically residing in external memory and in order to retrieve it from external memory; Wider-interfaces are used that provide data in bursts. This makes the implementation of a byte-oriented design for the entire mapping procedure impractical. Instant discloser addresses this issue and allows complete flexibility in the multiplexing structure and the Virtual Concatenation Group (VCG) creation to make the most-efficient use of the bandwidth. It is able to map hundreds of VCGs without significant increase in the complexity and cost of the implementation. Further the instant method will allow for Lower Order (LO) and Higher Order (HO) VCG's to be simultaneously handled without much change to the design.

OBJECTS OF THE INVENTION

The main objective of the invention is to achieve a method to transmit multiple data-streams of varying capacity data using Virtual Concatenation (VCAT) over Synchronous Digital Hierarchy (SDH) network.

Another object of the present invention is determining number of data bytes to be requested for each Virtual Concatenation Group (VCG) in a row-time of the aggregated bandwidth and storing it in a VCG request configuration memory.

Another object of the present invention is reading the requested number of data bytes from each data-stream one-at-a-time in to a Row Buffer for each row time of an SDH frame.

Another object of the present invention is reading data stored in the Row Buffer from memory address determined by one or more connection memory wherein the connection memory is programmed to carry out sequencing of bytes of the Row Buffer based on the VCAT numbering.

Another object of the present invention is inserting path overhead (POH) and pointer information in to the read data streams to transmit multiple data-streams of varying capacity data using Virtual Concatenation (VCAT) over Synchronous Digital Hierarchy (SDH) network.

Another main object of the present invention is to develop a VCAT transmitter for multiple streams of varying capacity data over SDH network.

Another object of the present invention is to develop a VCG request configuration memory for storing predetermined number of data byte to be request for each Virtual Concatenation Group (VCG).

Another object of the present invention is to develop a Row Buffer to store the requested number of data bytes read from the data-streams for each row time of an SDH frame.

Another object of the present invention is to develop a connection memory programmed to carry out sequencing of bytes based on VCAT numbering to read data stored in the buffer.

Another object of the present invention is to develop a timing block to facilitate synchronization of the read data with frame and LCAS boundaries.

Another object of the present invention is to develop a POH insertion block to insert POH and pointer information to the data stream read form the row buffer to transmit multiple data-streams of varying capacity data using Virtual Concatenation (VCAT) over Synchronous Digital Hierarchy (SDH) network.

STATEMENT OF INVENTION

Instant invention provides for a method to transmit multiple data-streams of varying capacity data using Virtual Concatenation (VCAT) over Synchronous Digital Hierarchy (SDH) network, comprising steps of determining number of data bytes to be requested for each Virtual Concatenation Group (VCG) in a row-time of the aggregated bandwidth and storing it in a VCG request configuration memory, reading the requested number of data bytes from each data-stream in order in to a Row Buffer for each row time of an SDH frame, reading data stored in the Row Buffer from memory address determined by one or more connection memory wherein the connection memory is programmed to carry out sequencing of bytes of the Row Buffer based on the VCAT numbering, and inserting path overhead (POH) and pointer information in to the read data streams of step 'c' to transmit multiple data-streams of varying capacity data using Virtual Concatenation (VCAT) over Synchronous Digital Hierarchy (SDH) network; and it is also provides for a VCAT transmitter for multiple streams of varying capacity data over SDH network, comprising: VCG request configuration memory for storing predetermined number of data byte to be request for each Virtual Concatenation Group (VCG), Row Buffer to store the requested number of data bytes read from the data-streams for each row time of an SDH frame, connection memory programmed to carry out sequencing of bytes based on VCAT numbering to read data stored in the buffer, timing block to facilitate synchronization of the read data with frame and LCAS boundaries, and POH insertion block to insert POH and pointer information to the data read to transmit multiple data-streams of varying capacity data using Virtual Concatenation (VCAT) over Synchronous Digital Hierarchy (SDH) network.

BRIEF DESCRIPTION OF ACCOMPANYING DRAWINGS

FIG. 1 shows the structure of a Lower Order Tributary Unit (TU11) in an AU3 structure FIG. 2 shows the structure of a Higher Order Tributary Unit (VC3) in an AU3 Structure FIG. 3 shows the concept of several Virtual Concatenation Groups (VCGs) being carried in an SDH link FIG. 4 shows the top level block diagram of the add telecom block for two STM4's FIG. 5 shows Add side telecom structure of STM8

DETAILED DESCRIPTION OF THE INVENTION

Figure 1:
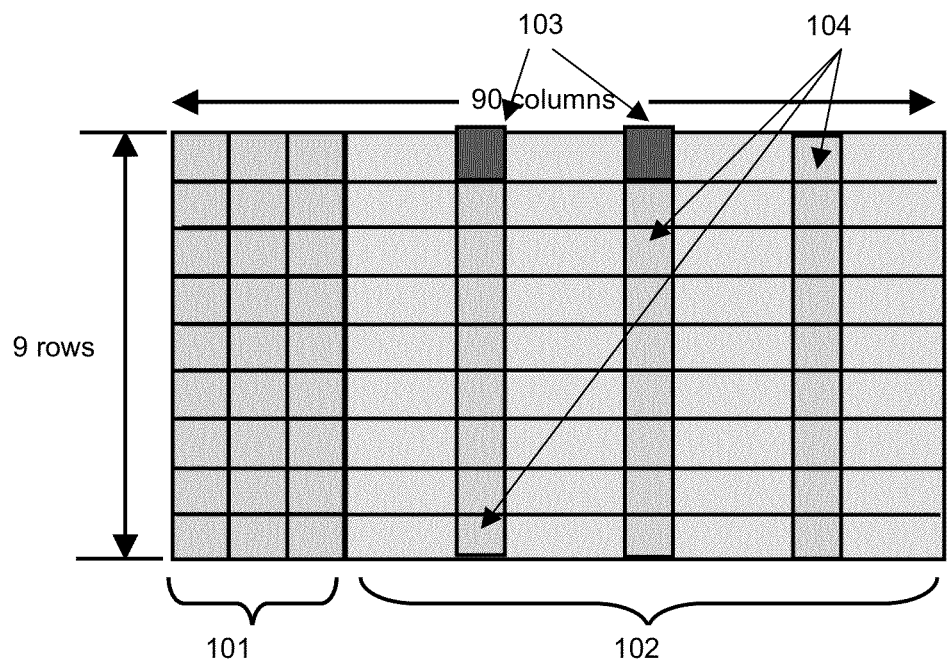

The primary embodiment of invention is a method to transmit multiple data-streams of varying capacity data using Virtual Concatenation (VCAT) over Synchronous Digital Hierarchy (SDH) network, comprising steps of:
a) determining number of data bytes to be requested for each Virtual Concatenation Group (VCG) in a row-time of the aggregated bandwidth and storing it in a VCG request configuration memory,
b) reading the requested number of data bytes from each data-stream in order in to a Row Buffer for each row time of an SDH frame,
c) reading data stored in the Row Buffer from memory address determined by one or more connection memory wherein the connection memory is programmed to carry out sequencing of bytes of the Row Buffer based on the VCAT numbering, and
d) inserting path overhead (POH) and pointer information in to the read data streams of step 'c' to transmit multiple data-streams of varying capacity data using Virtual Concatenation (VCAT) over Synchronous Digital Hierarchy (SDH) network.

In yet another embodiment of the present invention the requests facilitates for packing of the stream data into appropriate width of data-interface.

In still another embodiment of the present replicating the data buffers to allow parallel read out for multiple interfaces.

In still another embodiment of the present the configuration memory and connection memory are double buffered for automatic updates in conjunction with the LCAS state update.

In still another embodiment of the present the VCG data-stream being requested is Generic Framing Protocol (GFP) mapped Ethernet frames.

In still another embodiment of the present the method provides for mix of both Higher Order (HO) and Lower Order (LO) members.

In still another embodiment of the present the data request for first-row in a frame for LO VCG ignores two POH bytes.

In still another embodiment of the present invention is synchronizing the read data with frame and LCAS boundaries.

In still another embodiment of the present POH bytes to be inserted are double buffered and synchronization the POH bytes with frame and LCAS boundaries.

In still another embodiment of the present the update for the request configuration memory is done one row ahead of the change for the connection memory.

In still another embodiment of the present the method provides for scaling from STM0 to STM64.

In another main embodiment of the present a VCAT transmitter for multiple streams of varying capacity data over SDH network, comprising:
a) VCG request configuration memory for storing predetermined number of data byte to be request for each Virtual Concatenation Group (VCG),
b) Active Write Row Buffer to store the requested number of data bytes read from the data-streams for each row time of an SDH frame,
c) connection memory programmed to carry out sequencing of bytes based on VCAT numbering to read data stored in the buffer,
d) timing block to facilitate synchronization of the read data with frame and LCAS boundaries, and
e) POH insertion block to insert POH and pointer insertion information to the data read in step 'c' to transmit multiple data-streams of varying capacity data using Virtual Concatenation (VCAT) over Synchronous Digital Hierarchy (SDH) network.

In yet another embodiment of the present invention the Row buffers have write-port and read-port of different widths.

In still another embodiment of the present invention timing block provides for synchronization timing of row, column and multi-frame number to backplane timing.

In still another embodiment of the present invention timing block provides for signals used for POH and pointer insertion information.

In still another embodiment of the present invention timing block provides for re-synchronization if there is a change in backplane timing due to switchover.

In still another embodiment of the present invention replicating the data buffers to allow parallel read out for multiple interfaces.

In still another embodiment of the present invention the configuration memory for interleaving is double buffered for automatic updates in conjunction with the LCAS state update.

In still another embodiment of the present invention the transmitter provides for scaling from STM0 to STM64.

The present discloser discloses a technique where the transmitter is able to handle arbitrary mix of multiplexing structures in the SDH networks, with an arbitrary assignment of members to the streams. The transmitter can be scaled from STM0 to STM64 capacity and can offer hitless change in the configurations to support Link Capacity Adjustment Scheme (LCAS) feature. The mechanism is also capable of interfacing to a variety of sources of the stream data with interfaces to external memory, without putting stringent delay constraints on the external memory interfaces.

Instant discloser is the design of the Transmit side of the Virtual Concatenation (VCAT) processor. It supposes an understanding of the concepts of SDH Multiplexing and Virtual Concatenation as described in ITU G.707 and an understanding of LCAS described in ITU G.7042.

FIG. 1 shows the structure of a Lower Order Tributary Unit (TU11) in an AU3 structure. It is a SONET frame which is a block of 810 bytes put out every 125 μsec. It consists of 90 columns and 9 rows. This figure show for a Lower order (LO) VCG where the first three columns indicate Section Overhead (SOH) 101 and the remaining ones the payload 102. Each TU11 consists of 3 columns in the payload area as depicted. Figure shows path overhead (POH) bytes 103 and the payload bytes 104, in the three columns assigned to the TU11 container. The Path Overhead bytes are transmitted every frame and a set of 4 frames (with different POH bytes in each) is called a Lower-Order Multi Frame. Similarly, other granularity of Tributary units (TU12, TU2) have another specified number of columns for each member in the payload area.

Figure 2:
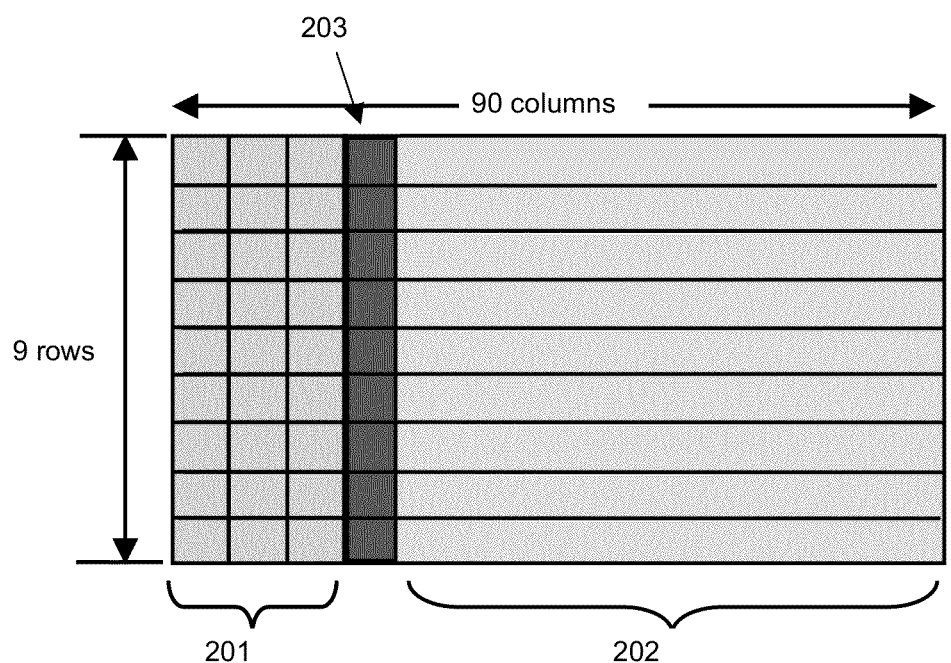

FIG. 2 shows the structure of a Higher Order Tributary Unit (VC3) in an AU3 Structure. It is a SONET frame which is a block of 810 bytes put out every 125 μsec. It consists of 90 columns and 9 rows. This figure shows a Higher Order (HO) Tributary Unit where first three columns indicate section overhead (SOH) 201 and the 4$^{th}$ column comprises path overhead (POH) bytes 203 and the remaining columns represent the payload 202. Other Higher Order Containers are similarly defined in the G.707 standard.

The reason to show these different types of containers is to show that since the bytes available for the payload differ depending on the mode and size of the Tributary Units, it is important that the VCAT design be able to handle an arbitrary multiplexing structure. Thus, some Container can contain TU11 tributaries and some other TU12 tributaries and other can even be higher-order tributaries. Of course, as defined in the G.707 standard, Virtual Concatenation makes a Virtual Concatenation Group (VCG) by using member Tributary Units that are of the same granularity.

Figure 3:
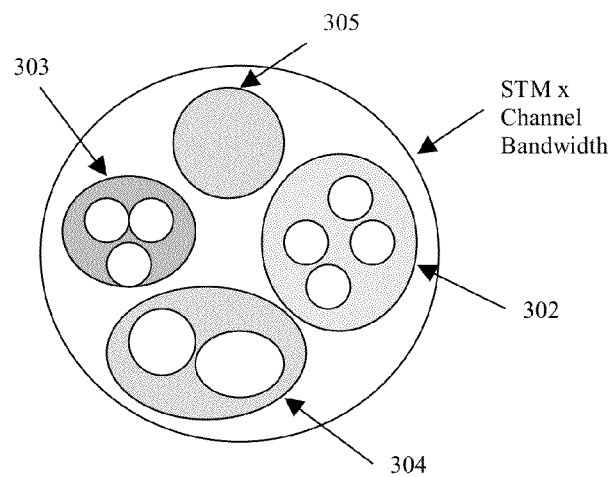

FIG. 3 shows an STM channel. This channel is occupied by multiple VCG's (302, 304, 303 and 305). For example let us say that VCG 302 is occupied by 4 TU12, VCG 304 is occupied by two VC4 and VCG 303 is occupied by three VC3. This helps in utilizing the entire bandwidth more efficiently.

It is customary to represent each member in an SDH stream by specifying the index it occupies at each level of the multiplexing structure. This is commonly called the A-k-l-m number where the "A" is the STM-1 number, the "k" the AU3/AU4 number, the "l" the TU2 number and the "m" the TU11 or TU12 in the TU2. Note also, that at different levels in the multiplexing scheme, the network may choose to use different granularity of Tributaries to meet their network traffic requirements. Thus associated with each A-k-l-m is a "mode" that represents the size of the Tributary Unit that is indexed.

Add Side Telecom Design for VCAT

The packet data for every port is mapped into a variable number of members transmitted over the STM-n stream. This is called the Add Side since data-traffic is being added to the network. The number of members and their sequence can change at LCAS frame boundaries.

In one exemplary embodiment we envision the entire telecom layer to be working at 77 MHz. At this rate we need to drive 4 bytes every clock cycle for STM-16 operation or 2 bytes per clock for STM8 operation. For the STM8 mode, FIG. 4 shows the top-level view of the various blocks that are required to perform the VCAT operation.

Figure 4:
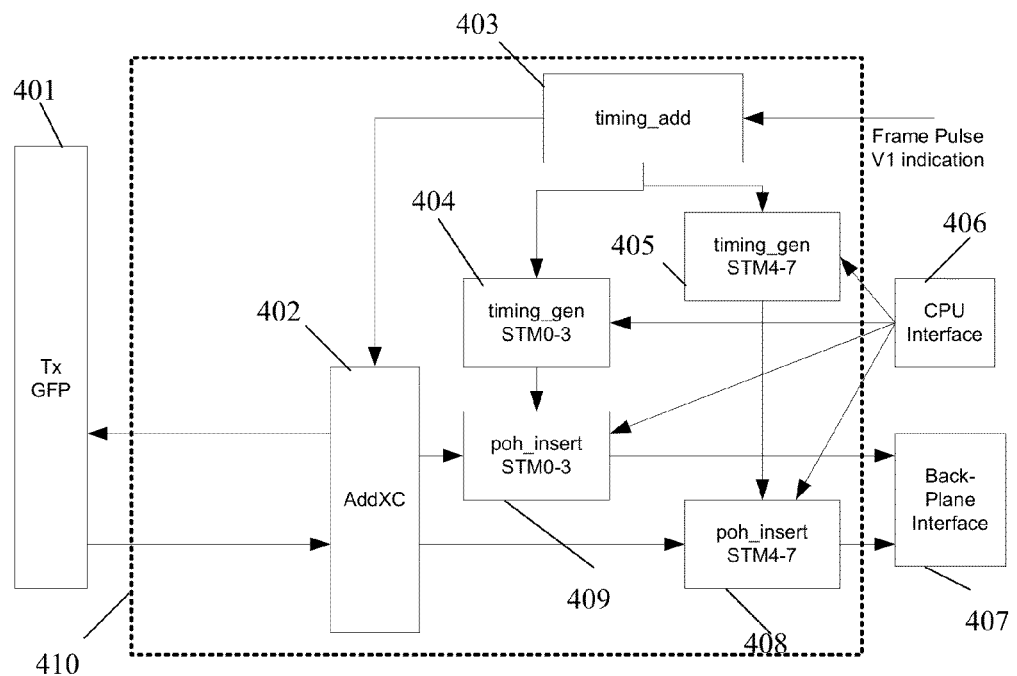

FIG. 4 shows top level block diagram of the add telecom block for two stm4's. The details of the Add-side 410 are best understood in the context of a multiple STM4 instantiation since there are some blocks that are common to the multiple instances and other blocks that are common. Each of the STM4 modules is configured by software depending on the provisioning. Here we will describe the blocks in the add-side telecom design and a brief description of their role.

AddXC 402: This block is responsible for generating the data stream that contains all the payload data for the various VCGs. The data is requested from a block called TxGFP (indicating GFP mapped packet data in accordance with ITU G.7041) 401, but can be any data source that needs to be transported over the VCG. The data source is capable of serving the requests for data from this module.

timing_add 403: This block is responsible for generating the internal row, column and frame counts as per the STM4 frame structure. This is locked to the timing received from the backplane interface 407. The synchronization of the frame number (the Lower Order multiframe count of 4) is done on the basis of the multi-frame timing (V1 pulse) received from the backplane. The frame-count, row-count and column-count are common to multiple STM4 blocks. The main task of this block is to synchronize the timing of the row, column, and multi-frame number to the backplane timing so that data transmitted from this line-card is properly synchronized to the switch-fabric timing.

The design re-synchronizes to a new timing if there is a change in the backplane timing due to a switchover of the central switch fabric. The design is robust to occasional loss in the backplane timing at which point it will continue to work with the old synchronization unless a new timing reference is seen.

timing_gen 404, 405: These identical blocks have a CPU port to configure the multiplexing structure for the various Administrative Unit Group (AUG)s in the specific STM4. The configuration is stored in Internal memory. It uses this information along with the signals from the timing_add block 403 to generate the A-k-l-m numbers and the au_mode for use by the other blocks in the design. In particular, the POH and Pointer insertion blocks need to know what cycle to insert the appropriate overhead bytes into the final stream. The row and column numbers produced by this block are local to the container, so that the column indicates the payload column in that container. Thus the column count for a TU12 will range from 0 to 3 while that for a VC3 will range from 0 to 83 (skipping the stuffing columns as per the multiplexing structure) The main task of the timing_gen block is to understand the multiplexing-structure and use the appropriate inputs from the timing_add to create the signals used for the poh and pointer insertion. There is a microprocessor interface to configure the multiplexing structure that is stored in distributed-RAM to allow for instant access. The aug_count and au-count are used to determine which of the column counts should be forwarded to the poh_insert blocks (408 and 409). The FSM also generated the "mode" signal that is used to determine the subsequent addresses and actions in the poh_insert block. The output of this block are the following signals

| Output Name | Description |
| --- | --- |
| soh_valid | When set to 1, it indicates that the column is part of the SOH part of the frame |
| frm_no | The Multi-frame number for this current cycle. This is a 12-bit frame count and various bits in the count tell of the appropriate POH byte to be inserted. |
| row_no | The row of the frame (0 to 8 as per the 9 rows in the frame) |
| col_no | The column number specific to this member. |
| aklm | The TU-member that resides in this clock cycle. |
| mode | The MODE encoding for this member. | poh_insert 408, 409: This block has a CPU interface that sets the various bytes that have to be inserted for the specific Tributary Units. The A-k-l-m and mode information, along with the frame_count, row-count and column-count identify the byte (Path-Overhead or Pointer Value) that has to be replaced in the incoming stream.

Add Side Cross-Connect Block (AddXC)

One of the aspects of the instat invention is the design of the module that is responsible for fetching data from several streams and interleaving it in a data-stream that is compatible with the STM framing, while allowing for appropriate gaps where Path Overhead (POH) bytes and pointers can be inserted.

Figure 5:
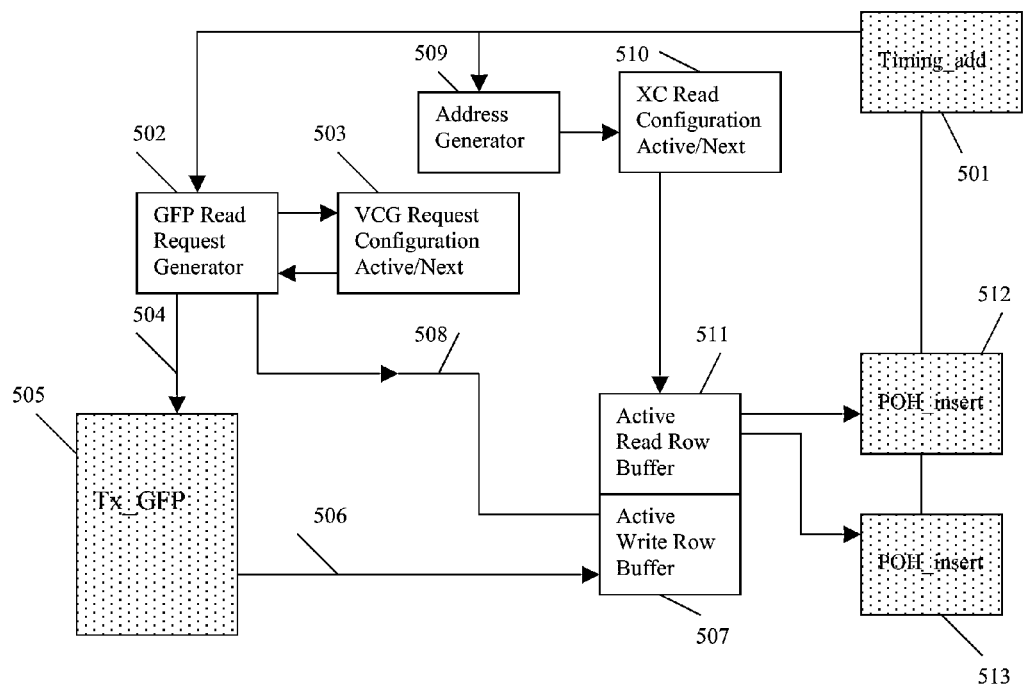

FIG. 5 shows detailed block diagram of AddXC block 402 of FIG. 4 along with the components like Timing_add, Tx_GFP, and two instances of poh_insert from FIG. 4 (numbered as 501, 505 and 509,510 respectively).

We envisage a controller 502 that is aware of the row boundaries, frame, Lower-Order multi-frame, and LCAS multi-frame boundaries. For the appropriate STM frame, it knows the number of bytes that are required for each VCG during every row (can be different for the first-row of a lower-order frame). This number is broken into multiple requests 504, limited to a maximum of 4 bytes per request (enough to support STM16 operation). This sequence of requests is determined by a program module and written in the "VCG Request Configuration" memory 503.

The key invention is to request for all the data in a Row for a VCG before requesting the data from another VCG. Furthermore, the data is simply stored in Row Buffer memory in the order that the packet-stream provides the data. For a given VCG, the packet-stream has to be de-multiplexed into the Tributary Units according to the sequence number of the member in the VCG. Furthermore, the framing of lower-order and Higher Order members has to be considered since in the first row of a Lower Order member, there are two bytes occupied by the POH. The actual interleaving of the bytes is done at the time of reading from the row-buffer utilizing a Connection Memory that reads the bytes in an order that accomplishes the interleaving.

The Requests that are made per VCG also have to consider whether the VCG is Higher Order (HO) or Lower Order (LO) as well as the number of members and the packing of the 32-bit words. This series of requests can be implemented using State Machines and logic gates. Alternately, in order to reduce the logic complexity and critical path issues in the generation of requests to be made for each VCG, program modules can populate a Request Configuration Memory, 503, that provides the guidance on how these requests are to be made. This memory is double buffered, the Active page is used for Request Generation while the standby page is CPU-writeable. The Active page is updated in conjunction with the LCAS state update.

For Lower Order VCG, the request for the first-row in a frame needs to ignore the POH bytes that will be added later by the POH-insertion logic. Thus, fewer bytes are requested during the first-row of an SDH frame for all the lower order members. This gap is filled by the POH bytes by the poh_insert logic that follows. The request generation logic is therefore required to get the row number that is being requested from the timing generator block.

Each row of the "VCG Request Configuration" has the following fields.

| Field Name | Description |
| --- | --- |
| Valid | The row contains a valid request |
| Port_ID | The VCG that the request is being made for. This is used by the Tx_GFP block to fetch the bytes from the appropriate stream. |

-continued

| Field Name | Description |
| --- | --- |
| LO_POH | The Request has bytes for the Lower-Order POH bytes. No request is made for the first-row of a frame but the byte-address computation for the write-address of subsequent bytes in the Row buffer is updated. Essentially this produces a "hole" in the stream where POH bytes for Lower Order are inserted later on. |
| Repeat | When this field is '0' the "Count" field refers to the number of bytes being requested and the count field can be 1, 2, or 3. If this field is '1', then the "Count field" is the number of 4-byte requests that have to be made for this VCG. |
| Count | Indicates the number of bytes to be requested if a non-4-byte request is made. When Repeat == 1, this indicates the number of 4-byte requests that have to be made to the Tx_GFP block. |

For each request, 504, made to the GFP framer, 505, a corresponding address, 508, is generated that determines how to write the data, 506, corresponding to this request into the "Active Write Row Buffer" 507. The GFP request contains the Port_ID and the byte_cnt (number of bytes being requested). The byte_cnt is used to update the byte address for the data. The address and the byte_cnt is used to write the appropriate bytes in the 32-bit (or appropriate width) row buffer. The row-buffer is double buffered so that while data is being fetched from the Tx_GFP block and written into the "Active Write Row Buffer" for a particular row in the SDH frame, the data stored in the previous frame, in the now "Active Read Row Buffer" can be sent out. The role of each buffer switches from Write to Read and vice-versa at the start of each row time. The Width of the Row-buffer must be adequate to support the STM-N aggregate link at the clock-frequency of operation.

One issue that is addressed in this design is that the width of the Row Buffer influences the sequence of requests that need to be made. Since the number of bytes required to fill the members in a VCG during a given row-time may not be an integral multiple of the row-width, we will have partially filled rows in the row-buffer. Also, in the case of the first-row of the Lower order VCGs, we will have a number of bytes that will not be requested but the remaining payload bytes in the row have to be placed in the columns as in the subsequent rows. Program modules has therefore got to break the requests in a manner that the data received from the Tx_GFP block in 1 cycle should not span multiple rows. This adds a little complexity in the program that configures the Request memory but greatly reduces the hardware logic complexity.

Figure 6:
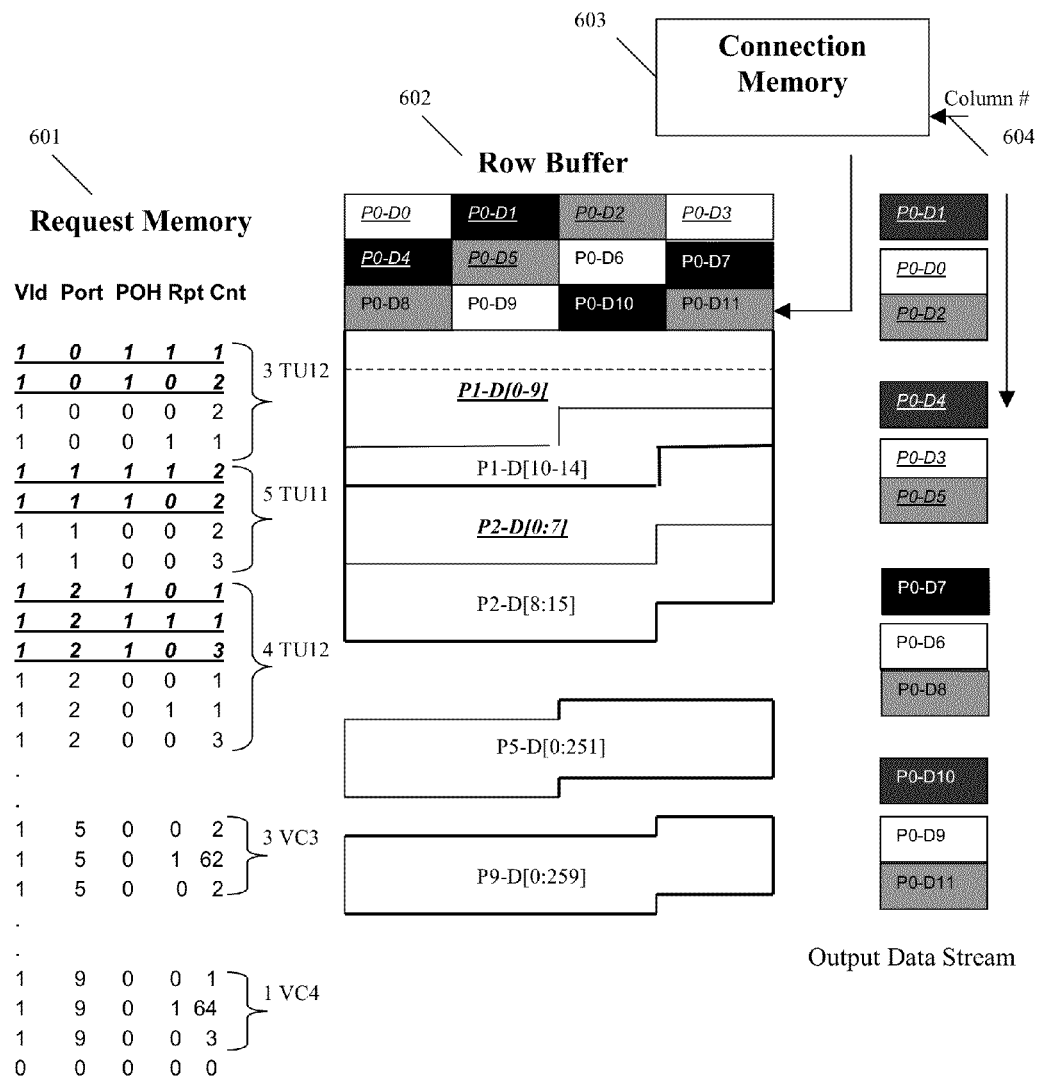
FIG. 6 shows Request Generation and Payload Re-sequencing in the AddXC module

FIG. 6 shows an example of the manner in which requests would be made and data received from the Tx_GFP block would be written in to the Row Buffer. In the exemplary case of the VCG labeled 0 we have 3 TU12 members, each PU12 member requiring 4 bytes in an SDH row. Therefore a total of 12 bytes will be requested and the data received will be P0-D0 to P0-D11 where the number associated with P is the VCG label and the number associated with D is the Byte number in that stream. As described in FIG. 1, there are two POH bytes in the first row. Therefore a total of 6 bytes for the POH in the first row, bytes P0-D0 to P0-D5, and 6 bytes are the payload, P0-D6 to P0-D11, for the VCG labeled 0. The data bytes are placed in order in the row buffer when they are requested.

Similarly, for the next VCG labeled 1 which has 5 members that are TU11 (3 bytes per SDH row), we have 15 bytes total of which there are 10 bytes of POH that result in 2 entries in the Request memory, the first for 2 repetitions of 4-bytes each and the second for the remaining 2 bytes. After this the next entry request 2 bytes of payload so as to fit the gap in the row buffer after byte P1-D9, and the next entry requests the remaining 3 out of the 5 payload bytes.

Note that for the lower-order tributaries there are parts of the request that are specific for the POH bytes. These requests, where POH-1 in the Request memory, are skipped during the first row but the subsequent data requests are made for the and the data-stream gets written with the appropriate offset after skipping the size of the POH requests.

Also, note that the request are made so that data for a request does not result in writes to two different memory addresses in the row buffer. This is required to ensure that a request can be serviced every cycle.

Since the Higher-Order TU's have a separate column in the SDH frame to carry the Path Overhead, there is no difference between the requests made for the first row and the subsequent row. In FIG. 6, we show VCG labeled 5 as having 3 VC3 for a total payload capacity of 3 times 84 bytes. In this example we assume that the VCGs between 2 and 5 result in the row-buffer being occupied so that the first byte of VCG5 will lie in the $3^{rd}$ column in the 4-byte wide Row Buffer. Thus even though the total bytes requested is a multiple of 4, due to the requirement that the data stream from a request span a single address in the row-buffer, three entries need to be created in the Request memory. Similarly a request for a single VC4 requires 260 bytes and this too is shown split across multiple requests.

Since the number of requests is variable, we require that software signal the end of the valid requests by writing an entry with the valid bit set to 0. On reading such an entry from the Request memory the requests will terminated and the request controller, 502 in FIG. 5, will wait for the next row to be indicated by the timing_add bock 501.

At the start of a row-time, the Active Write Row buffer is switched. The previous Active Write Buffer now becomes the Active Read Buffer and the data previously requested for transmission needs to be sent-out as a serial stream with the appropriate placement in bytes into the members that are assigned to the VCGs. This task of re-sequencing the data stream into the appropriate columns of the SDH frame is done with the help of a XC Read Configuration, 510 in FIG. 5 and Connection Memory 603 in FIG. 6 which are configured by a program module.

The connection memory is used for the re-sequencing of the bytes for the different VCG's into a single data-stream that is consistent with the SDH frame format and which places the bytes into columns in the SDH frame as per the sequence number of the members. This is accomplished by addressing the connection-memory with a column count, 604 in FIG. 6, that is locked to the row changes in the SDH frame. An entry in the connection memory 603 can address a byte in the STM8 row buffer if the column belongs to a TU that is mapped to one of the VCG's. By making the Connection memory span the entire frame, we are able to handle any arbitrary multiplexing structure. For example, the mapping of a VC3 container into an AU3 unit and into a TUG3 structure differ in the columns that are skipped. Software, can determine the mapping of the members to columns in the SDH frame based on the Multiplexing scheme.

| Field | Description |
| --- | --- |
| Valid | Signifies that the column contains valid payload and the payload should be obtained from the Row Buffer. For Invalid columns we will fill a fixed pattern (0's or 1's) depending on what software configures. |

-continued

| Field | Description |
| --- | --- |
| InvalidData | This field indicates the type of data byte to be inserted for the invalid columns. This field can be expanded as required later to add flexibility. |
| Address | Provides an address into the STM-8/16 Row Buffer for payload data. |

FIG. 5 also shows the manner in which data is read from the read/write row buffer 507 and 511. The data read depends on the entries in the connection memory 510. The read address is determined by the connection memory, which is programmed to carry out the sequencing of bytes based on the VCAT numbering for the consecutive bytes of the data for a VCG. FIG. 6 shows how the bytes for VCG labeled 0, are interleaved across the multiple columns. In this example the order of the TU's as we scan the columns across the SDH frame is member 1, member 0, and member 2. Thus when the column count gets to member 1, we get an address from the connection memory that points to the byte P0-D1, and then for column for member 0 it gives out the address P0_D0 and finally for the third TU with sequence number 2 it points to P0_D2. Note that the column count will correspond to the three TU's again and here the next set of 3 bytes will be placed in the appropriate columns. Also, note that in the case of the Lower Order TU's, we did not recover any data from the data-streams for the POH bytes during the first row, thus there will be no placed in these and the poh_insert blocks that follow, 512 and 513 in FIG. 5, will add the appropriate path-overhead. In the case of Higher-Order TU's the columns corresponding to the POH will not have any valid address into the row-buffer and so no payload will be placed in these columns.

In the description in FIG. 5 for STM8 design with STM4 locks, we require to read 2 bytes every cycle from the Active Read Row Buffer. This can be accomplished by using the two ports of this memory since there are no writes into this memory; to writes happen to the Active Write Row Buffer.

The description above is exemplary, and it will be clear to a practitioner skilled in the art, that alternate implementations of the request memory and row-buffer are possible. Furthermore, it is not a requirement that data be packed into the row buffer. Ads long as there is agreement in the logic implementation of the request generation and between software as to what the arrangement of data-bytes in the row-buffer is, the appropriate addressing can be specified in the connection-memory to achieve the desired interleaving of the bytes as per the VCG configuration.

Figure 7:
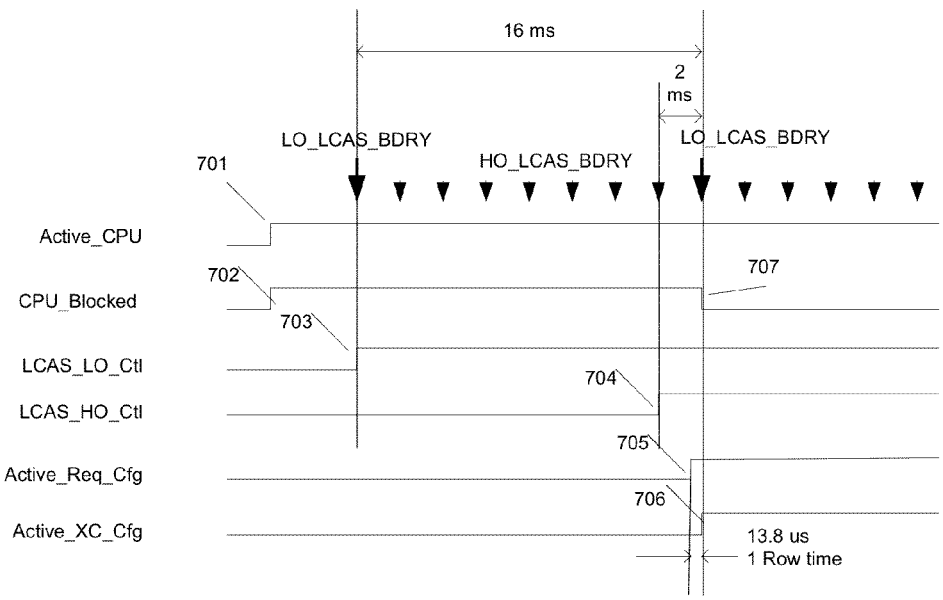
FIG. 7 shows requests made to the GFP Framer, one row ahead

The Connection memory and the Request memory are double buffered to account for the change in the VCG configuration. FIG. 7 shows how the various parts of the configuration are switched in order to achieve hitless operation on a change in the VCG configuration when the LCAS protocol is in place. The LCAS control words that are added as part of the Path-overhead (which control the sequence and validity of the members that are concatenated) are associated with the subsequent LCAS frame of data. The size of the LCAS frame is 2 msec (2 milli seconds) for Higher-order and 16 msec for Lower-Order tributaries. Since the LCAS frame sizes differ, we choose the larger one, 16 msec for the Lower Order LCAS, as the time at which to make changes for both lower-order and Higher-order VCGs.

By fixing the LCAS boundary at which all the output data-stream reflects the new CPU configuration, we can determine the appropriate times for making some of the changes in selection of what active configuration to use for the various double-buffered configurations. Thus 701 refers to the time at which the CPU indicated a new configuration had been written and this is independent of the LCAS boundaries. Since the new configurations are not in effect, the CPU is blocked at this time, event 702. At the next Lower-Order LCAS boundary, 703, we are free to indicate, via the LCAS control words in the POH bytes, the new sequencing for the TU's that will be effect during the subsequent LCAS frame (after 706). Similarly, during the last 2 msec, we change the Higher Order LCAS control, 704, to indicate that during the next Higher-Order LCAS frame (starting also at 706) the data will be interleaved as per the updated configuration. Note that since the data is fetched from the Tx_GFP block one row prior to the transmission of the serial stream, the update for the request must be done at time 705. Finally at the next LCAS boundary, 706, we are in a position to use the new Cross-Connect Configuration for the updated VCG settings. One can observe that the Control words for LCAS change 1 LCAS frame prior to the data with the 16 ms duration, 703 to 706, appropriate to Lower Order VCGs and appropriate 2 ms duration for higher-ordr VCGs, 704 to 706.

Figure 8:
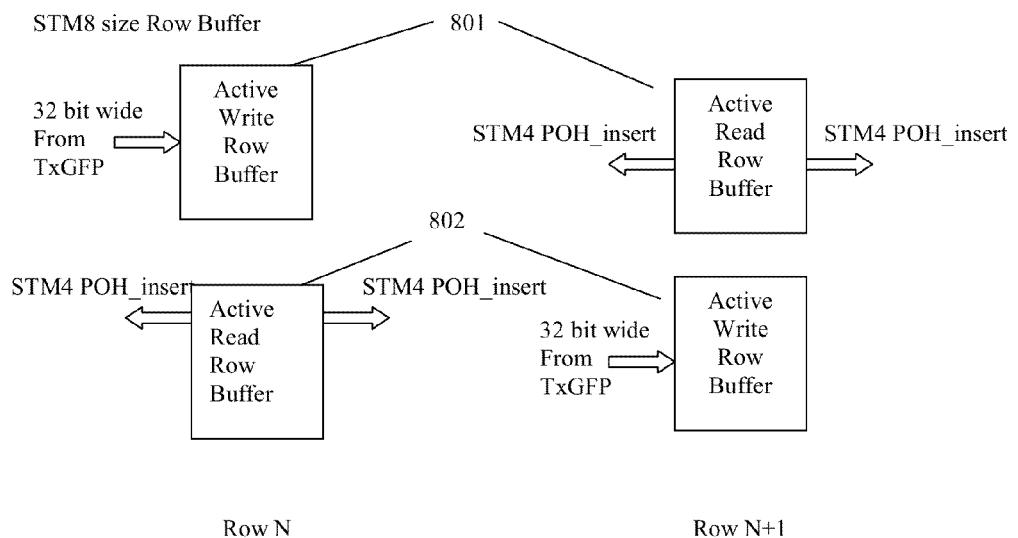
FIG. 8 shows the Port Use for the double buffered Row Memory Buffer

For implementing the finer granularity of row changes in the Row Buffers, a double-buffered scheme is used that is switched on a row-by-row basis. To support an STM8 design we can use separate memories for the double buffering with 32-bit write port running at 77 MHz and 8-bit port read port. FIG. 8 shows the read/write row buffer in more elaborate manner. There are two separate Buffer memories, 801 and 802, each capable of holding all the bytes in a row of STM8 frame. During some row, say Row N, the data coming from the GFP block is written into memory 801 and during this row it serves as the Active Write Memory. The memory width is chosen depending on the bandwidth of the GFP streams to be handled. In one embodiment this is chosen as 32 bit wide since the GFP block is capable of supporting it. While writes happen to memory 801, reads can happen from its double buffered counterpart, memory 802, which for this row duration is called the Active read memory. Reading of data from the read memory depends on the format which is required by the poh_insert blocks. For example if the poh_insert block handles an STM4 stream, then in order to handle the STM8 aggregate link, we need to have two reads from this read memory. We utilize the fact that there are no writes happening to the Read Row Buffer, so we can utilize the 32-bit port as a n 8-bit read port with the appropriate addressing and selection logic. Alternately if the poh_insert logic was capable of handling an STM8 stream, only 1 read port would have been adequate without the requirement to multiplex the other port between write and read modes. For the next row time, Row N+1, the roles of the memories 801 and 802 are reversed, with the memory 801 now acting as the Active Read Row Buffer and 802 acting as the Active Write Row Buffer.

Figure 9:
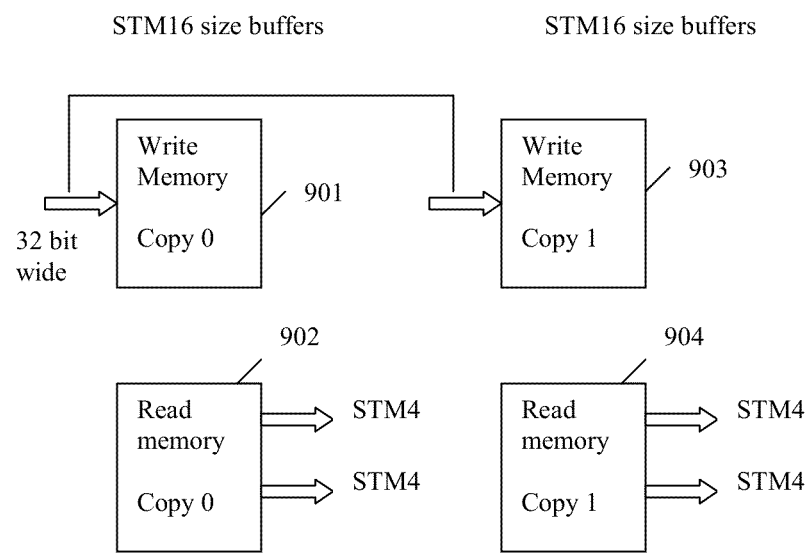
FIG. 9 shows the port use of the in an STM16 design made up of STM4 read blocks

In order to handle larger data-rates, say STM16 rate, with poh_insert blocks acting at STM4 rates, we will require additional Row Buffers. Since we usually have only maximum of two ports to read from on a memory, especially in FPGA, and we require a total of 4 such byte-wide ports for the 4 STM4 streams, we will have to replicate the writes into two memories. This is shown in FIG. 9 which shows two copies 901 and 903 of the Active Write Buffer, each capable of holding a row of STM16 SDH frame of data. This dramatically increases the amount of storage required for the Row Buffers. The Active Read Row buffers 904 and 902, each use both the ports with addresses coming from XC_Configuration RAMS that handle the columns and thereby the tributaries that are mapped to the corresponding STM4 part of the aggregate.

An alternate implementation for the STM16 design could be made that is more memory efficient but requires the POH_inert block to run at STM8 rates. This would be simply like the design of FIG. 8, with the Row Buffers being capable of handling the STM16 row data and the addresses for the Read ports coming from two XC_Configuration RAMS, each capable of interleaving columns for an STM8 design.

Figure 10:
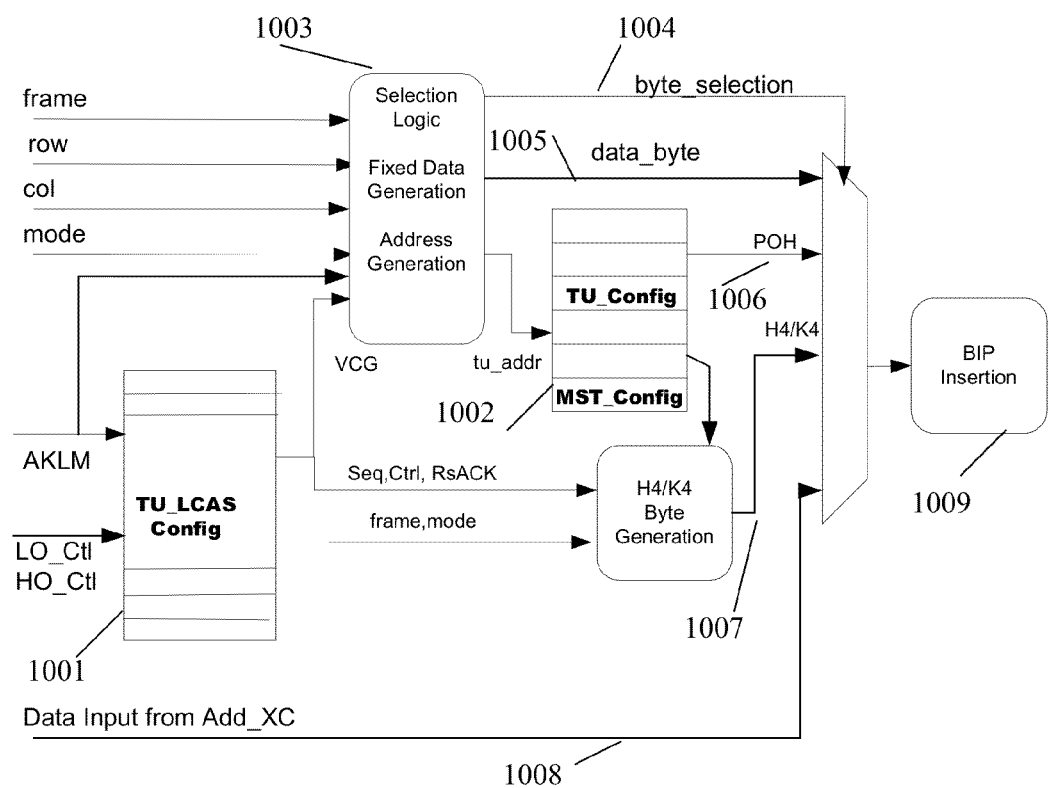
FIG. 10 shows overall structure of the Path Overhead and Pointer Insertion logic.

Once the operation of the block is clear, there are a few optimizations that enable us to use FPGA resources in a more optimal manner. One of them is the structure of the Row Buffers as we address higher capacity designs. At STM4 rates, we need to send a byte every 77 MHz clock cycle. As we scale the capacity of the VCAT processor, we either need to increase the data rate while operating on a byte wide basis, or keep the clock frequency at 77 MHz but have a way of reading from multiple locations in the Row Buffer (one byte location for each STM4 of capacity). We can use the fact that we are writing to one buffer at a time, and during the other service time this port is idle. Hence we can use this port as the read-port for the second STM4. This allows us to get multiple read ports without duplicating the memory. For the case of STM16, we will have to duplicate the writes into two separate memories, so we can use the same principle and get 4 read ports at 77 Mhz (FIG. 10). We also have the option of avoiding the memory duplication if we opt to run the read side at 155 Mhz.

As the design scales to higher rates, we either need to adopt a memory technology that offers more than 2 ports or replicate the memory appropriately to get the read bandwidth. We can also consider scaling the speed of the read side in that case to 155 MHz and that will reduce the amount of memory. Notice also that the write-side data-width will have to correspondingly increase for an STM64 design.

The determination of how to get the appropriate byte-streams from the Row Buffer is a function of the design technology and clock-speed of operation that is feasible. The examples here are to illustrate that there are lot of design tradeoffs possible to accommodate various slower technologies like FPGAs or richer technologies like ASICS (that may have more number of read ports possible in the memory blocks).

Once the main task of interleaving the data streams into the appropriate columns in the SDH-frame is accomplished, the only task prior to launching this over the optical interfaces is to insert the appropriate Pointers (to locate the payload in the frame) and the Path Overheads that allow the LCAS and VCAT state machines to handle the recovery of the data-streams at the sink node.

The poh_insert block 408 409 takes care of inserting appropriate path overhead bytes into the STM-N streams FIG. 10, shows a possible implementation This comprises two main dual-ported block RAMS, the double-buffered TU_LCAS_Config RAM 1001 and the single-buffered TU_Config RAM 1002 (FIG. 10). The TU_LCAS_Config RAM 1001 holds the control information relevant to the LCAS operation (like the Control, the Sequence, and RsACK fields that form the LCAS control word). It is double-buffered so that the proper control-information can be sent out when an LCAS change occurs as was denied earlier, FIG. 7. The contents of the TU_Config RAM hold Path Overhead bytes, 1006, like the Path Trace and other fields that are typically user-configured. The mail piece of logic is 1003 and it is responsible for determining which byte needs to be sent out. The multiplexer control, 1004, selects the appropriate byte. This could be fixed data bytes 1005 (like Pointers and other fixed values), or Path Overhead Bytes 1006 (that are provided by the user), or LCAS control data 1007 (that is a function of the frame number and some of the data retrieved from the TU_LCAS_Config RAM 1001) or in the absence of any special handling, the incoming data 1008 (from the Ad XC module). Once the path overheads and pointers are inserted appropriately, a final Bit Interleaved Parity (BIP) calculation 1009 can be performed on the Payload for every Tributary and the appropriate byte in the SDH frame is update.

The SDH stream that results from the above processing is then sent to a Line Interface Unit for appropriate scrambling and Section Overhead processing prior to being transmitted.

The description above is exemplary and variations in the implementation, the structuring of the memories, data-path widths and partitioning with different groupings of the basic blocks are all possible depending on the design constraints.

The invention claimed is:

1. A method to transmit multiple data-streams of varying number and granularity of channels using Virtual Concatenation (VCAT) over Synchronous Digital Hierarchy (SDH) network, comprising steps of:
   a) determining the path overhead bytes and number of payload data bytes to be requested for each Virtual Concatenation Group (VCG) in a row-time of the aggregated bandwidth as per the number and granularity of channels assigned to each VCG, and storing it as a set of instructions in a VCG request-configuration memory,
   b) interpreting the set of instructions and reading the requested number of data bytes from the specified data-stream if the set of instructions specify that payload data is to be fetched and placing the fetched payload data in a sequential order in to a Row Buffer for each row time of an SDH frame, wherein the set of instructions to read the bytes from the specified data-stream facilitates placing of the previous data-streams into the Row Buffer for reading so that each payload data fetch does not result in multiple writes to the Row Buffer,
   c) reading from one or more connection memory location, during the next row-time, the address of the data byte to be transmitted based on the mapping of the TU-channel to the VCAT numbering for every SDH column and accessing the Row Buffer from this address to carry out sequencing of bytes of the Row Buffer based on the VCAT numbering, and
   d) inserting double buffered path overhead (POH) bytes, pointer information in to the data read from the Row Buffer and synchronizing the POH bytes with frame and LCAS boundaries to transmit multiple data-streams of varying capacity data using Virtual Concatenation (VCAT) over Synchronous Digital Hierarchy (SDH) network;
   wherein the update for the request configuration memory is done one row ahead of the change for the connection memory.

2. The method as claimed in claim 1, wherein the requests facilitates for packing of the stream data into appropriate width of data-interface and the row-buffer memory.

3. The method as claimed in claim 1, comprising replicating the data buffers to allow parallel read out for multiple interfaces.

4. The method as claimed in claim 1, wherein the request-configuration memory and connection memory are double buffered for automatic updates in conjunction with the LCAS state update.

5. The method as claimed in claim 1, wherein the VCG data-stream being requested is Generic Framing Protocol (GFP) mapped Ethernet frames.

6. The method as claimed in claim 1, wherein the VCG's are of both Higher Order (HO) VCAT and Lower Order (LO) VCAT members.

7. A method to transmit multiple data-streams of varying number and granularity of channels using Virtual Concatenation (VCAT) over Synchronous Digital Hierarchy (SDH) network, comprising steps of:
   a) determining the path overhead bytes and number of payload data bytes to be requested for each Virtual Concatenation Group (VCG) in a row-time of the aggregated bandwidth as per the number and granularity of channels assigned to each VCG, and storing it as a set of instructions in a VCG request-configuration memory,
   b) interpreting the set of instructions and reading the requested number of data bytes from the specified data-stream if the set of instructions specify that payload data is to be fetched and placing the fetched payload data in a sequential order in to a Row Buffer for each row time of an SDH frame, wherein the set of instructions to read the bytes from the specified data-stream facilitates placing of the previous data-streams into the Row Buffer for reading so that each payload data fetch does not result in multiple writes to the Row Buffer,
   c) reading from one or more connection memory location, during the next row-time, the address of the data byte to be transmitted based on the mapping of the TU-channel to the VCAT numbering for every SDH column and accessing the Row Buffer from this address to carry out sequencing of bytes of the Row Buffer based on the VCAT numbering, and
   d) inserting double buffered path overhead (POH) bytes, pointer information in to the data read from the Row Buffer and synchronizing the POH bytes with frame and LCAS boundaries to transmit multiple data-streams of varying capacity data using Virtual Concatenation (VCAT) over Synchronous Digital Hierarchy (SDH) network;
   wherein the data request for first-row in a frame for LO VCG ignores two POH bytes.

8. The method as claimed in claim 1, comprising synchronizing the read data with frame and LCAS boundaries.

9. The method as claimed in claim 1, wherein the method provides for scaling from STM0 to STM64.

10. A VCAT transmitter for transmitting multiple streams of varying number and granularity of channels over SDH network comprising:
   a) VCG request configuration memory for storing predetermined number of path overhead bytes and number of payload data bytes to be request for each Virtual Concatenation Group (VCG),
   b) Active Write Row Buffer to store the requested number of data bytes read from the specified data-streams in a sequential order for each row time of an SDH frame wherein storing does not result in multiple writes,
   c) connection memory to store the address of the data byte in the Row buffer to be read during next row time based on the mapping of the TU-channel to the VCAT numbering to carry out sequencing of bytes based on VCAT numbering,
   d) timing block to facilitate synchronization of the read data with frame and LCAS boundaries, and
   e) POH insertion block to insert double buffered POH bytes and pointer insertion information to the data read from the row Buffer to transmit multiple data-streams of varying capacity data using Virtual Concatenation (VCAT) over Synchronous Digital Hierarchy (SDH) network;

wherein the transmitter is configured such that the data request for first-row in a frame for LO VCG ignores two POH bytes, and wherein the transmitter is configured such that the update for the request configuration memory is done one row ahead of the change for the connection memory.

11. The transmitter as claimed in claim 10, wherein the Row buffer have write-port and read-port of different widths.

12. The transmitter as claimed in claim 10, wherein the timing block provides for synchronization timing of row, column and multi-frame number to backplane timing.

13. The transmitter as claimed in claim 10, wherein the timing block provides for signals used for POH and pointer insertion information.

14. The transmitter as claimed in claim 10, wherein the timing block provides for re-synchronization if there is a change in backplane timing due to switchover.

15. The transmitter as claimed in claim 10, configured for replicating the data buffers to allow parallel read out for multiple interfaces.

16. The transmitter as claimed in claim 10, wherein the configuration memory for interleaving is double buffered for automatic updates in conjunction with the LCAS state update.

17. The transmitter as claimed in claim 10, wherein the transmitter provides for scaling from STM0 to STM64.

18. The method as claimed in claim 7, wherein the requests facilitates for packing of the stream data into appropriate width of data-interface and the row-buffer memory.

19. The method as claimed in claim 7, comprising replicating the data buffers to allow parallel read out for multiple interfaces.

20. The method as claimed in claim 7, wherein the request-configuration memory and connection memory are double buffered for automatic updates in conjunction with the LCAS state update.

* * * * *